UNITED STATES PATENT OFFICE.

ROBERT M. COBBAN, OF MISSOULA, MONTANA.

COMPOSITION OF MATTER.

1,034,979.  Specification of Letters Patent.  Patented Aug. 6, 1912.

No Drawing. Application filed March 16, 1911. Serial No. 614,863.

*To all whom it may concern:*

Be it known that I, ROBERT M. COBBAN, a citizen of the United States, residing at Missoula, in the county of Missoula and State of Montana, have invented a new and useful composition of matter to be used as a flux in welding iron and steel and in the treatment of oxid of iron, as iron and steel "burnt" in forging and welding, whereby the oxid of iron is reconverted to a metallic state.

My improved composition consists of the following ingredients, combined in substantially the following proportions, by weight:—Silica ($SiO_2$), 75 per cent.; alumina ($Al_2O_3$), 15 per cent.; oxid of lime (CaO), 2 per cent.; potassium oxid ($K_2O$), and sodium oxid ($Na_2O$), 8 per cent. To prepare the same for use, the ingredients are reduced to finely granular and preferably to powdered form and thoroughly mixed.

In welding, my improved composition is used in the same manner as borax and other well known fluxes, being applied to the parts to be welded while at a welding heat, the parts being then subjected to pressure, either by hammering or by passing them through pressure rolls, as of a rolling mill.

For use in converting oxid of iron into metallic iron, that is, to restore "burnt" iron or steel, the "burnt" iron or steel is subjected to the action of the described composition, usually in a dry state, preferably by embedding the "burnt" portion thereof, while at a temperature approximating a welding heat, in a quantity of said mixture and permitting it to remain therein until the reaction extends through the entire piece or bar. This will vary with the size of the bar or piece being treated, but with small work will require only a short time, usually from one-half a minute to two minutes.

I have found that "burnt" iron or steel restored by the use of my improved composition is somewhat more open than before being "burnt", but that its original texture can be restored by pressure, either by hammering or by the action of pressure rolls.

While I have attained the best results with the use of a composition consisting of the ingredients specified in substantially the proportions given, I have found that these proportions admit of a considerable range of variation without materially affecting the results, and I do not, therefore, desire to limit myself to the exact proportions given. Also, as potassium oxid and sodium oxid are equivalents of each other, the relative proportions of these ingredients may be varied as desired, so that, together they constitute the specified percentage of the entire compound.

I claim:—

1. The herein described composition of matter for treating iron and iron oxid consisting of silica ($SiO_2$), alumina ($Al_2O_3$), oxid of lime (CaO), and potassium oxid ($K_2O$) and sodium oxid ($Na_2O$), substantially as described.

2. The herein described composition of matter for treating iron and iron oxid consisting of silica ($SiO_2$) 75 per cent., alumina ($Al_2O_3$) 15 per cent., oxid of lime (CaO) 2 per cent., and potassium oxid ($K_2O$) and sodium oxid ($Na_2O$) 8 per cent., substantially as described.

In testimony, that I claim the foregoing as my invention, I affix my signature in presence of two subscribing witnesses, this 9th day of March, A. D. 1911.

ROBERT M. COBBAN.

Witnesses:
B. C. FECHTIG,
FRED A. McDONALD.